United States Patent
Stringer

[11] Patent Number: 5,706,705
[45] Date of Patent: Jan. 13, 1998

[54] LOW PROFILE PUSH-BUTTON MECHANICAL REMOTE CONTROL

[75] Inventor: Calvin R. Stringer, Saugus, Calif.

[73] Assignee: P. L. Porter Co., Woodland Hills, Calif.

[21] Appl. No.: 621,260

[22] Filed: Mar. 21, 1996

[51] Int. Cl.⁶ .............................. F16C 1/10; G05G 1/04; A47C 1/02

[52] U.S. Cl. ...................... 74/502; 74/523; 74/567; 74/500.5; 74/501.6; 297/85; 297/463.1

[58] Field of Search ................ 74/523, 557, 537, 74/538, 528, 543, 545, 546, 567, 501.6, 506; 297/85, 463.1, 342

[56] References Cited

U.S. PATENT DOCUMENTS

| | | | |
|---|---|---|---|
| 4,454,785 | 6/1984 | Furrer | 74/523 |
| 4,643,043 | 2/1987 | Furuta et al. | 74/503 |
| 4,774,850 | 10/1988 | Shovlin | 74/475 |
| 4,884,668 | 12/1989 | Kobayashi et al. | 74/543 |
| 5,107,720 | 4/1992 | Hatfield | 74/502 |
| 5,179,870 | 1/1993 | Behrens et al. | 74/475 |
| 5,497,676 | 3/1996 | Barnard | 74/501.5 R |
| 5,509,326 | 4/1996 | Belmond | 74/523 |
| 5,595,420 | 1/1997 | Rogers | 297/85 |

Primary Examiner—Vinh T. Luong
Attorney, Agent, or Firm—Beehler & Pavitt

[57] ABSTRACT

A push-button actuator for attachment to a Bowden type remote control cable has a frame, a lever pivoted to the frame and connected to the control wire, a plunger reciprocable through an actuating stroke transverse to the control wire for turning the lever and thereby pulling the control wire from the cable sleeve, an exposed portion of the control wire extending from the cable sleeve to the lever transversely to the plunger stroke. The lower end of the plunger in its normal condition is positioned above the wire and moves to a depressed position below the exposed portion of the wire during the actuation stroke, such that the plunger is unimpeded by the wire in its stroke, allowing the cable sleeve to be attached on the frame at a location vertically intermediate the normal and depressed positions of the lower end of the plunger and thereby achieve a more compact push-button actuator assembly.

7 Claims, 2 Drawing Sheets

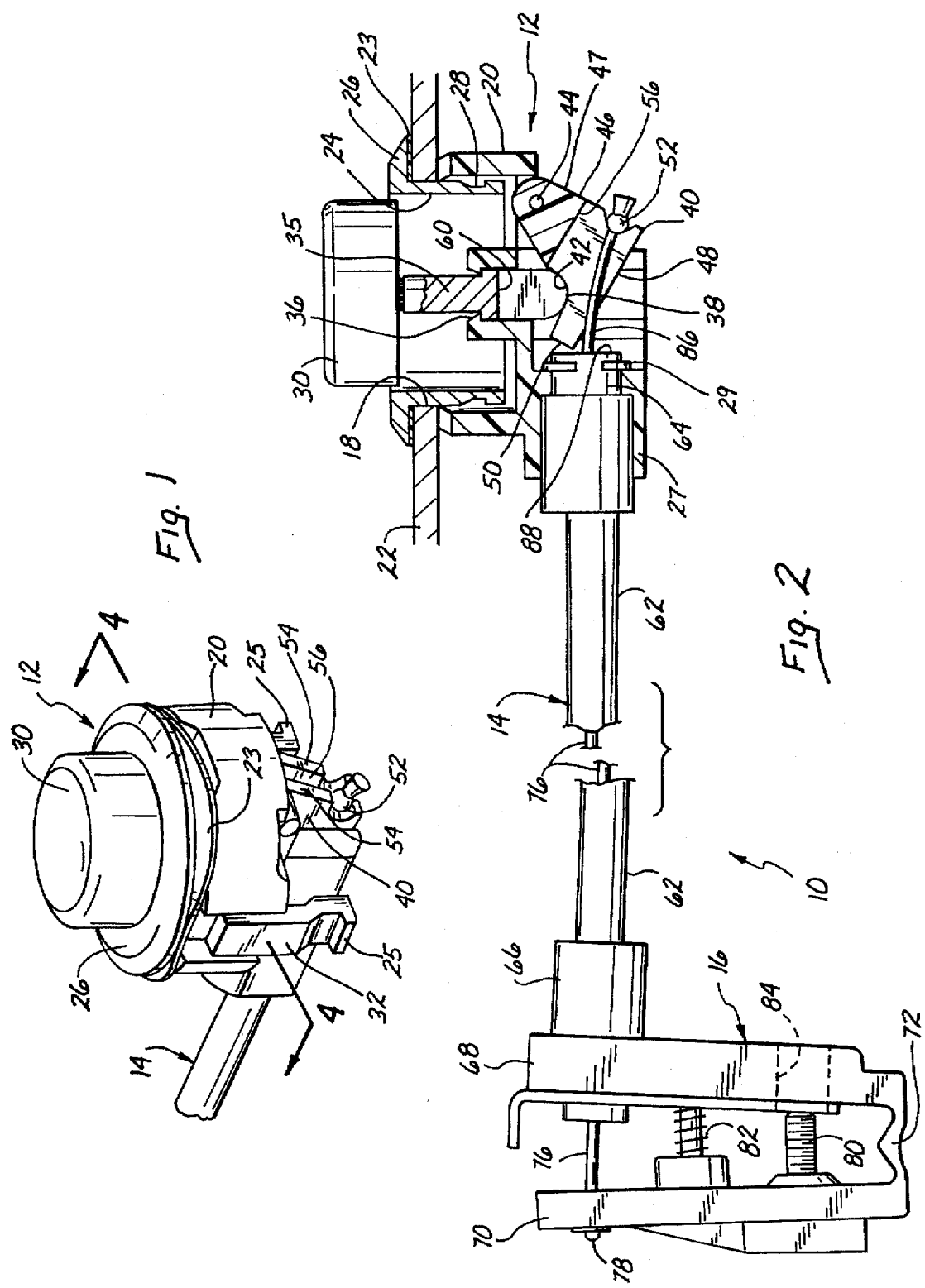

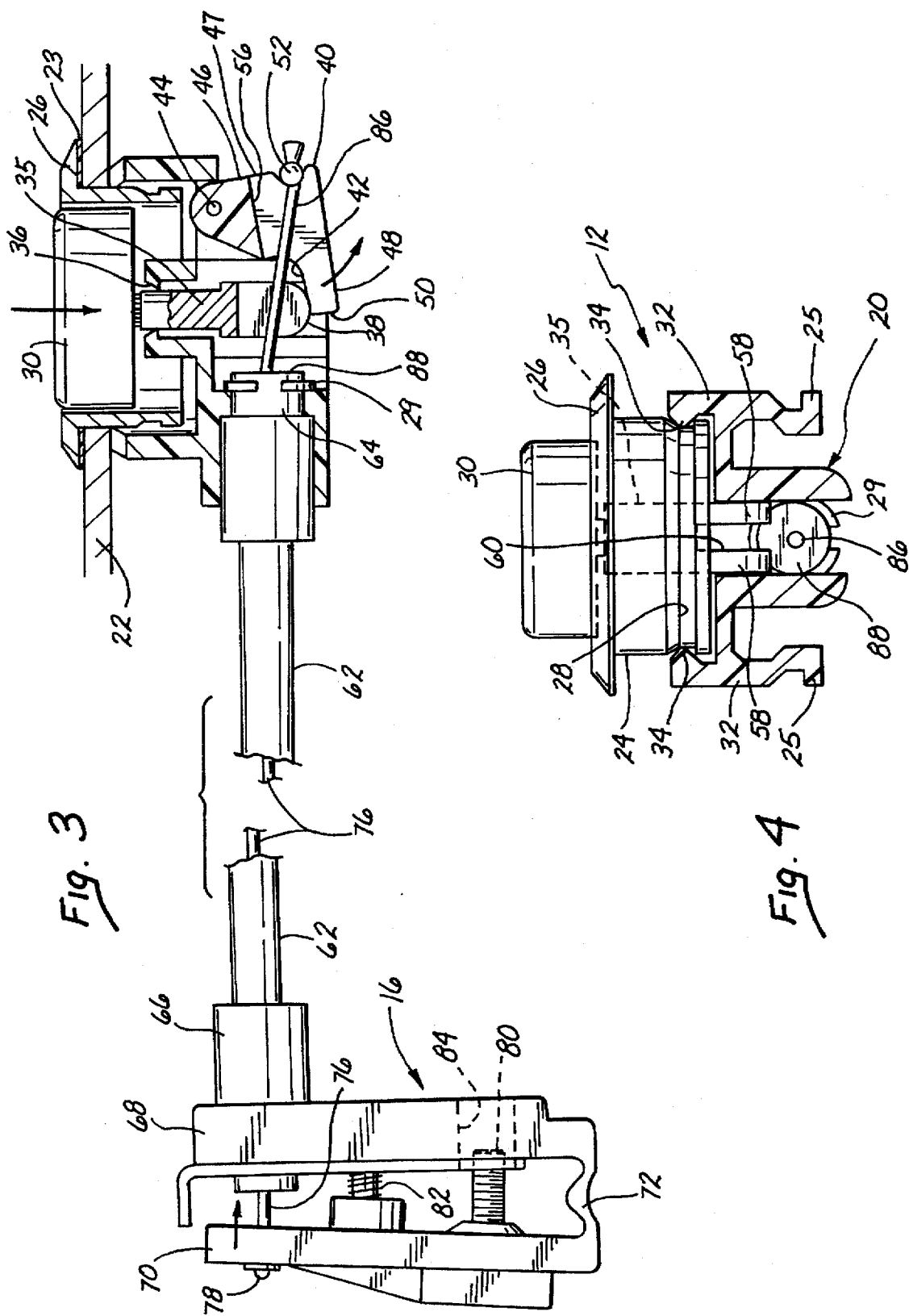

LOW PROFILE PUSH-BUTTON MECHANICAL REMOTE CONTROL

BACKGROUND OF THE INVENTION

1. Field of the Invention

This invention relates generally to the field of recliner seats of the type having a back rest positioning device actuated by a mechanical remote control and, more particularly, pertains to an improved push-button control for the same.

2. State of the Prior Art

Recliner seats, particularly passenger seats in airliners, have a positioner device which is connected between the movable back rest of the seat and a stationary frame of the seat. Each seat normally has a remote control system which includes a push-button remote control mounted on an arm rest of the seat, an actuator mounted on the positioner unit, and a mechanical linkage such as a Bowden type control cable connecting the remote control to the actuator. Pressing the push-button by an occupant of the seat unlocks the positioner, to permit adjustment of the back rest to a new position for optimum comfort.

The arm-rest of an airliner recliner seat typically is formed as a hollow shell which serves as a housing for various controls, including the recliner's push-button remote control. Existing push-button controls of this type have a frame assembly mounted in a hole in a side wall of the arm rest. A push-button depresses a plunger against a lever pivoted to the frame assembly of the control unit. The lever pivots in response and pulls on a wire slidable through a stationary sleeve of the control cable. The opposite end of the wire operates on the actuator to momentarily release the seat back positioner, freeing the seat back for repositioning as may be desired for comfort.

While this general type of remote control works well, the development of airliner passenger seating with slimmer arm rests has created a need for more compact, lower profile push button remote controls. Currently available push-button remote controls require more arm rest interior space than is desirable for use with the slimmer arm rests.

SUMMARY OF THE INVENTION

This invention addresses the aforementioned difficulties by providing an improved push-button control for a Bowden type cable remote control. The novel control has a frame, a lever pivoted to the frame, a plunger reciprocable in the frame through an actuating stroke for turning the lever from a normal position to a depressed position, a cable sleeve having a sleeve end attached to the frame transversely to the actuating stroke, a control wire longitudinally displaceable in the sleeve, the wire having an exposed wire portion extending from the sleeve end across the stroke axis of the plunger, the wire being displaceable through the sleeve by the lever in response to turning of the lever, and a spring for returning the lever to its normal position. The plunger is arranged and configured for moving across the exposed portion of the wire during the actuating stroke, such that the sleeve end may be mounted to the frame at a location above a lowermost point of the actuating stroke to thereby achieve a more compact actuator assembly. The control may be arranged such that portions of the lever move across the exposed wire portion during turning of the lever. In particular, the plunger may have a lower end acting against the lever, the lower end moving across the exposed wire portion during the actuating stroke. The plunger end may be in operative engagement with the lever, such as camming engagement, and the plunger end may be shaped and configured to admit the exposed portion of the wire during the actuating stroke. The lever may pivot in a vertical plane containing the longitudinal axis of the actuating stroke, and the exposed wire portion may extend transversely to the actuating stroke within the same vertical plane.

The plunger may make camming engagement with the lever at a point or zone of camming contact such that the camming contact zone is displaced across the exposed wire portion during said actuating stroke. The lower end of the plunger and camming portion of the lever may be slotted or bifurcated in a common vertical plane containing the stroke axis of the plunger for admitting the exposed wire portion through a slot in the lever and into an end slot of the plunger.

In a presently preferred form of the invention, the lever is partly divided by a lever slot into two camming edges, the lower end of the plunger is divided into two prongs by an end slot, and each prong is in camming engagement with a corresponding one of the camming edges, the exposed portion of the control wire being received in the end slot of the plunger during at least a part of the actuating stroke. Preferably, the exposed portion of the wire normally extends through the lever slot.

BRIEF DESCRIPTION OF THE DRAWINGS

FIG. 1 is a perspective view of a push button remote control according to this invention;

FIG. 2 is a cross-sectional view of a remote control system including the control of FIG. 1 connected to an actuator assembly by means of a control cable, the system being depicted in its normal or locked condition;

FIG. 3 is a view as in FIG. 2 showing the push button control in fully depressed condition and the actuator closed in response thereto; and FIG. 4 is a view partly in section of the push-button remote control taken along line 4—4 in FIG. 1.

DETAILED DESCRIPTION OF THE PREFERRED EMBODIMENT

With reference to the accompanying drawings, FIGS. 2 and 3 depict a mechanical remote control system, generally designated by the numeral 10, for use with a conventional positioner in a recliner seat. The system includes a remote control 12 connected to an actuator 16 by a Bowden type control cable 14. For purposes of the following description it is assumed that the system 10 is installed in a typical airliner reclinable passenger seat with a conventional positioner device connected between the adjustable back-rest and a stationary bottom of the seat, such that the actuator 16 is mounted for controlling the positioner and the remote control 12 is mounted to an armrest of the recliner seat.

The push-button remote control 12, as shown in FIGS. 2 and 3, is mounted in a hole 18 of an armrest wall 22. The wall 22 has an exterior side accessible to a chair occupant and an interior side. The control 12 has a cylindrical sleeve 24 with a radial flange 26 at its upper end and a radial groove 28 near an open bottom. The sleeve 24 is inserted into the mounting hole from the exterior of the arm rest to bring the flange 26 against the exterior side of armrest wall 22. A frame 20 fits onto the bottom of the sleeve 24 within the armrest. The frame 20 is integrally formed with a pair of diametrically opposed resilient retaining arms 32, seen in FIGS. 1 and 4. Each arm 32 has a detent 34 which projects radially inwardly and engages into the groove 28 to retain the frame 20 to the sleeve. A rim of the armrest wall 22 surrounding the mounting hole 18 is captive in an interference fit between the upper end of the frame 20 and the flange 26 to secure the control 12 in place. A spring washer 23 compressed between flange 26 and the armrest wall 22 eliminates loose play in the assembly. The control 12 can be disassembled and removed from the hole 18 by pressing radially inwardly onto the lower ends 25 of the two retaining arms to retract the detents 34 from the groove 28, allowing the frame 20 to separate axially from the sleeve 24.

The sleeve 24 and the frame 20 together contain the moving parts of the push-button control unit 12. A plunger 35 is free to move up and down through an actuating stroke within a collar 36 defined in the frame 20. A push-button 30 is fixed to the upper end of the plunger and slides within the sleeve 24. A lever 40 is generally L-shaped, and is pivoted at 44 near the top of its vertical arm 46 to the frame 20 at a location radially outer to the plunger 35. The horizontal arm 48 of the lever extends radially inwardly towards the plunger 35 and terminates in a free end 50. The horizontal arm 48 of the lever is bifurcated by a vertical lever slot 56 into two legs 54, shown in FIG. 1. Each leg 54 of the lever has an upper camming edge 42. The two camming edges 42 are concavely curved in the vertical plane and are mutually parallel on either side of slot 56.

The plunger 35 has a lower end 38 which is also bifurcated in a vertical plane, as shown in FIG. 4, to define two parallel prongs 58 separated by a vertical end slot 60. The lower end of each prong 58 is rounded and is in camming engagement with a corresponding camming edge 42 of the lever 40. The vertical slot 60 of the plunger and the vertical slot 56 of the lever are open to each other along the zone of camming contact between the lever and the plunger. Further, slots 56 and 60 lie in a common vertical plane which also contains the actuating stroke axis of the plunger 35.

The control cable 14 has an outer sleeve 62 with an end fitting 64 which fits in a receptacle 27 integral to the frame 20, and is secured to the frame 20 by a split ring 29. The opposite end 66 of sleeve 62 is secured to a stationary jaw 68 of the actuator 16. The actuator has a movable jaw 70 connected to the stationary jaw 68 by hinge 72. The two jaws 68, 70 and hinge 72 are all molded as a unitary component of thermoplastic material. The fixed jaw 68 is mounted to the housing of a linear hydraulic positioner (not shown in the drawings) which may be of a conventional type commonly used in recliner seats. For example, one such positioner is described in U.S. Pat. No. 5,211,379.

A control wire 76 is longitudinally slidable within the cable sleeve 62. At the remote control 12 an exposed portion 86 of the wire 76 extends from the sleeve end 88 through the lever slot 56 and is engaged at 52 to the lower end of the vertical arm 46 at the edge 47 of the lever 40. The exposed wire portion 86 which is distal to the sleeve end 88 is transverse to the longitudinal axis of the actuating stroke axis of the plunger 35, and is contained in the same vertical plane as the stroke axis.

The opposite end 78 of the control wire is attached to the actuator 16 near the free end of the movable jaw 70. A spring 82 biases apart the actuator jaws 68, 70 to a normally open condition, thereby also pulling the control wire 76 and lever 40 of remote control 12 to a normal condition also shown in FIG. 2. An actuating pin 80, threaded into the movable jaw 70 near the hinge 72 for mechanical advantage, is aligned with a through hole 84 in the fixed jaw.

When the push-button 30 is pressed down from its normal position of FIG. 2, the plunger 35 is pushed through a downstroke against the lever 40. The lever responds by turning counter-clockwise about pivot point 44, allowing the plunger end 38, i.e. the ends of the prongs 58, to slide in camming action against the camming edges 42 towards free end 50. Free end 50 is depressed from the normal elevated position of FIG. 2, to the depressed position shown in FIG. 3, and the vertical arm 46 swings away from the cable end 88, pulling wire 76 to the right in the figure and out of the cable sleeve 62 to the condition shown in FIG. 3.

This action causes the opposite end of the wire at the actuator 16 to retract into the sleeve 62, drawing the movable jaw 70 towards stationary jaw 68. The pin 80 is driven into through hole 84 and against a release pin (not shown) provided on the positioner device, momentarily unlocking the positioner to allow repositioning of the back rest of the recliner seat. Upon release of the button 30, spring 82 on the actuator spreads the movable jaw away from the stationary jaw, returning the entire system 10 to its normal condition of FIG. 2, and locking the positioner to fix the seat backrest in the newly selected position.

In the normal position of the control system 10, the camming end 38 of plunger 35 is positioned above the exposed wire portion 86, as seen in FIG. 2. When the push button 30 is depressed, driving the plunger 35 through its down-stroke to the fully depressed position of FIG. 3, the lower end 38 of the plunger crosses the exposed wire portion 86 to a position where the plunger end 38 is positioned well below the exposed wire portion 86. Likewise, the free end 50 of the lever 40, in following the down stroke of the plunger, moves across the exposed wire portion 86. As described previously, the slot 60 of the plunger is aligned with the slot 56 of the lever in a vertical plane so that both the lever and the plunger are unimpeded in their movement through the actuating stroke by the exposed wire portion 86. The exposed wire portion 86 normally extends through the slot 56 of the lever and is admitted into the end slot 60 of the plunger during the lowermost portion of the down stroke.

In particular it should be noted that the point or zone of camming contact between the plunger end 38 and camming edges 42 of the lever move in the vertical plane across the exposed wire portion 86 during the actuating stroke of the plunger. Initially camming contact occurs above the wire portion 86, as in FIG. 2, and moves to a location below the wire portion 86 in the fully depressed condition of FIG. 3.

In effect, the bifurcated lever 35 and bifurcated plunger 40 both straddle the exposed wire portion 86 so that the depth of the down stroke is not limited or impeded by the transverse exposed wire portion 86. This is an important consideration because it allows the end fitting 64 of the control cable, from which extends the exposed wire portion 86, to be mounted to the frame 20 at a location above the lowermost position of the plunger end 38 during its actuation stroke.

In prior remote push-button control devices of this type, the cable sleeve end 88 had to be mounted beneath the lowermost position of both the plunger end and the lever 40, so that the exposed wire portion 86 extending across the axis of the plunger stroke would not to interfere with the downward motion of the plunger and lever. This requirement increased the physical depth of the push-button control unit within the armrest of the recliner seat. This difficulty is overcome by the present invention by bifurcating both the lever 40 and the lower portion of the plunger 35 as just described.

The result is that the overall depth of the control assembly 12 below the supporting wall 22 is substantially lesser than in comparable prior art push-button controls. This, in turn, allows the control assembly of this invention to be used in seating applications demanding a more compact, lower profile control unit.

While reference has been made throughout the foregoing disclosure to an installation in an aircraft reclining passenger seat, it should be understood that this invention is not restricted to that particular type of seating, and may be used with equal advantage in other seating as well as non-seating applications and installations where push-button cable controls are used.

While a preferred form of the invention has been described and illustrated for purposes of clarity and example, many changes, substitutions and modifications to the described embodiment will become apparent to those possessed of ordinary skill in the art without thereby departing from the scope and spirit of the present invention, which is defined by the following claims.

What is claimed is:

1. A push button actuator for attachment to the end of a Bowden type cable remote control of the type having a control wire longitudinally slidable inside a cable sleeve and spring means urging the cable to a retracted position in the cable sleeve, comprising:

a frame, a lever pivoted to said frame and connected to the said control wire, a plunger reciprocable in a vertical direction in said frame through an actuating stroke between a normal and a depressed position, said plunger having a lower end engaged for turning said lever against the urging of the said spring means from a normal position to a depressed position responsive to said actuating stroke thereby to draw the control wire from the cable sleeve, means for attaching the cable sleeve to said frame with an exposed portion of the said control wire extending from said cable sleeve to said lever transversely to said plunger, said lower end of the plunger being positioned above said wire in said normal condition and being arranged and configured for moving to a depressed position below said exposed portion of said wire during said stroke, said means for attaching said cable sleeve being positioned on said frame at a location vertically intermediate said normal and depressed positions of said lower end of the plunger.

2. The actuator of claim 1 wherein said lower end of the plunger is in operative engagement with said lever, and said lower end is shaped and configured to admit said exposed portion of said wire during said stroke.

3. The actuator of claim 2 wherein said lower end is slotted for admitting said exposed portion of said wire during said stroke.

4. The actuator of claim 2 wherein said lower end is in camming engagement with said lever.

5. A push button actuator for attachment to the end of a Bowden type cable remote control of the type having a control wire longitudinally slidable inside a cable sleeve and spring means urging the cable to a retracted position in the cable sleeve, comprising:

a frame, a lever pivoted to said frame for movement between a normal position and a depressed position, the said cable sleeve having a sleeve end supported to said frame, the said wire having an exposed wire portion extending from said sleeve end to a wire end secured to said lever; a plunger having a lower end in camming engagement with said lever, said plunger being reciprocable in said frame through an actuating stroke for turning said lever from said normal position to said depressed position thereby to longitudinally displace said wire in said sleeve, a push-button on an upper end of said plunger, and means normally urging said lever to said normal position, said lever partly divided by a lever slot into two camming edges, said lower end of the plunger divided into two prongs by an end slot, each prong being in camming engagement with a corresponding one of said camming edges, said exposed portion of said wire being received in said end slot during a part of said actuating stroke.

6. The actuator of claim 5 wherein said exposed portion of the said wire normally extends through said lever slot.

7. A push button actuator for attachment to the end of a Bowden type cable remote control of the type having a control wire longitudinally slidable inside a cable sleeve and spring means urging the cable to a retracted position in the cable sleeve, comprising:

a frame, a plunger reciprocable in said frame through an actuating stroke, the said cable sleeve being supported to said frame, and a lever connected to the said control wire and pivoted to said frame for movement between a normal position and a depressed position thereby to pull the control wire from the cable sleeve against the said spring means, said lever having an edge distal to said sleeve end, said plunger having a lower end and said lever having a camming contact zone intermediate said sleeve end and said distal edge; the control wire having an exposed wire portion extending from said cable sleeve transversely to said actuating stroke to a wire end secured to said lever at said distal edge, said lower end being in camming engagement with said camming contact zone during said actuating stroke for turning said lever from said normal position to said depressed position thereby to displace the wire through the sleeve, characterized in that said camming contact zone is displaced across said exposed wire portion during said actuating stroke, and said lower end of the plunger and said camming contact zone of the lever are bifurcated for admitting said exposed wire portion through an end slot in said lever and into another end slot in said plunger.

* * * * *